(12) United States Patent
Learned et al.

(10) Patent No.: US 11,727,108 B2
(45) Date of Patent: Aug. 15, 2023

(54) SYSTEMS AND METHODS FOR PROVIDING SECURE PASSWORDS

(71) Applicant: Capital One Services, LLC, McLean, VA (US)

(72) Inventors: Jacob Learned, Brooklyn, NY (US);
Michael Saia, New York, NY (US);
Max Miracolo, Brooklyn, NY (US);
Kaylyn S. Gibilterra, New York, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 325 days.

(21) Appl. No.: 17/144,276

(22) Filed: Jan. 8, 2021

(65) Prior Publication Data

US 2022/0222332 A1 Jul. 14, 2022

(51) Int. Cl.
| | | |
|---|---|---|
| *G06F 21/46* | (2013.01) | |
| *G06F 16/9035* | (2019.01) | |
| *G06F 16/951* | (2019.01) | |
| *G06F 21/33* | (2013.01) | |

(52) U.S. Cl.
CPC .......... *G06F 21/46* (2013.01); *G06F 16/9035* (2019.01); *G06F 16/951* (2019.01); *G06F 21/33* (2013.01)

(58) Field of Classification Search
CPC ...... G06F 21/46; G06F 16/9035; G06F 21/33; G06F 16/31; G06F 16/325
See application file for complete search history.

(56) References Cited

U.S. PATENT DOCUMENTS

| | | | | |
|---|---|---|---|---|
| 10,331,879 | B1 * | 6/2019 | Jiang | H04L 63/083 |
| 2018/0060564 | A1 * | 3/2018 | Shapiro | G06F 21/31 |
| 2018/0246983 | A1 * | 8/2018 | Rathod | G06F 16/9566 |
| 2019/0036914 | A1 * | 1/2019 | Tzur-David | H04L 63/20 |
| 2020/0042694 | A1 * | 2/2020 | Karpovsky | G06N 20/00 |
| 2021/0081524 | A1 * | 3/2021 | Moon | G06F 21/46 |

\* cited by examiner

*Primary Examiner* — Daniel B Potratz
*Assistant Examiner* — Arif Khan
(74) *Attorney, Agent, or Firm* — Troutman Pepper Hamilton Sanders LLP; Christopher J. Forstner (57) ABSTRACT

Systems and methods for identifying and remedying password insecurities are disclosed. The systems and methods include crawling websites to identify popular cultural terms and saving the cultural terms in a backend system. The cultural terms can include names of celebrities, politicians, movies, and the like. An identification system receives a password and compares the received password to the cultural terms using a similarity score. If the number of similarities is above a predetermined threshold, or if the number of differences is below a predetermined threshold, the identification system denies the password. A recommendation system can generate a suggested password, which can also be compared to the cultural terms. The systems and methods also provide the ability to calculate a similarity score if the cultural terms or passwords are saved in an encrypted or hashed format.

19 Claims, 8 Drawing Sheets

SYSTEMS AND METHODS FOR PROVIDING SECURE PASSWORDS

FIELD

Examples of the present disclosure relate generally to systems and methods for identifying password insecurities; and more particularly, to systems and methods for identifying the use of common cultural terms in passwords and intervening to decrease the vulnerability of such passwords.

BACKGROUND

Consumer data is one of the most valuable commodities in today's digital economy. As a result, the number of entities that store sensitive information, such as names, addresses, social security numbers, banking information, and the like, has also grown. As custodians of this sensitive information, it is important for these entities to protect the information from fraudulent access. Despite many efforts, however, data breaches remain a major concern.

A common feature of large-scale data breaches is the widespread use of common passwords. The simple password "qwerty," for example, has been found millions of times across data breaches. And qwerty is far from the only culprit of the widespread reuse of the same or similar passwords. Humans prefer readable strings of characters that make the password easy to remember. It is common, therefore, for numerous users in a single database to adopt terms from popular culture, or cultural terms, as their password. A common password, for example, may include TaylorSwift, t@ylor$wift, or any variation thereof.

An issue with passwords containing cultural terms is that the passwords are easier for bad actors to guess. If a hacker attempts to break into a database with a brute-force attack, for example, the hacker does not need to know anything personal about the account holder who uses a cultural term. The hacker only needs access to common phrases known by anyone, modify them as necessary, and continue attacking until access is granted.

Current systems for password security do not acknowledge this potential for insecurity. Systems do not actively check to make sure that a password term is common knowledge or easily attainable. At best, current systems merely inform the account holder, when the password is being created, that the password is too short, contains too few special characters (e.g., !, @, #, $, %, etc.), is similar to a previous password, etc. In addition, current systems do not adapt to change password insecurities. A term that is not popular today, for example, may become popular next week.

What is needed, therefore, is a system and method that identifies these types of insecurities by monitoring terms that are common in culture. The system and method may also provide a remedy for such insecurities by denying an insecure password, for example, and/or suggesting more secure passwords.

BRIEF SUMMARY OF THE INVENTION

Examples of the present disclosure relate generally to systems and methods for identifying password insecurities and, more particularly, to systems and methods for identifying the use of common cultural terms in passwords and intervening to decrease the vulnerability of such passwords. The systems and methods can include searching a plurality of websites to identify a plurality of cultural terms. The cultural terms can include names of celebrities, politicians, movies, etc. The searching of the cultural terms can be performed by a backend system, which can then store the plurality of cultural terms in a database for later retrieval.

An identification system can then receive a password from a user device or third-party for verification. The identification system can compare the password to a plurality of cultural terms saved in the database. The comparison can be based on a similarity score calculated to approve or deny the password base on how similar the password is to each of the cultural terms. If the password is exactly the same as a cultural term, for example, the password can be denied. The similarity score can also provide some room for the user to adopt a password that includes a cultural term. The password may be approved, if the password has a certain number of different or additional characters than the cultural term. If the number of similar characters is below a predetermined threshold, on the other hand, the password can be denied.

If the password is denied based on the similarity score, the identification system can transmit a first notification to a recommendation system indicating that the password has been denied. The recommendation system can then generate a suggested password. The suggested password can be a random string of characters, similar to a CAPTCHA. In some examples, the suggested password can be a random human-readable password, which can look like common phrases so that the password is easy to remember. The suggested password can also be generated by combining cultural terms from the database in an uncommon way. In any example, the suggested password can also be compared to cultural terms to make sure the suggested password does not run afoul of security requirements.

The cultural terms and/or passwords can be received and stored in a variety of formats. In some examples, a password can be received in a plaintext format and then compared to plaintext cultural terms. In other examples, the cultural terms and/or passwords can be encrypted with the same encryption key or hashed with the same hash function. In these cases, the hashed or encrypted terms can be compared to determine the similarity scores.

These and other aspects of the present disclosure are described in the Detailed Description below and the accompanying figures. Other aspects and features of examples of the present disclosure will become apparent to those of ordinary skill in the art upon reviewing the following description of specific, exemplary examples of the present invention in concert with the figures. While features of the present disclosure can be discussed relative to certain examples and figures, all examples of the present disclosure can include one or more of the features discussed herein. Further, while one or more examples can be discussed as having certain advantageous features, one or more of such features can also be used with the various examples of the invention discussed herein. In similar fashion, while exemplary examples can be discussed below as device, system, or method examples, it is to be understood that such exemplary examples can be implemented in various devices, systems, and methods of the present invention.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner In the drawings.

DETAILED DESCRIPTION

Examples of the present disclosure include systems and methods for identifying cultural terms in passwords and determining if the password is a potential insecurity. Throughout this disclosure, it can be understood that a "cultural term" is a common word or phrase that is known to the general public. This can include, for example, names of celebrities, politicians, athletes, and the like. A cultural term can also include common phrases that are not associated with a particular person, such as titles of television shows, titles of movies, prevalent political phrases (e.g., "electoral college"), catch phrases, and the like. The term can also include prevalent businesses or entities (e.g., Tesla®), among other things.

The system can include one or more components, which may or may not be a part of a single system or computing environment, that can identify cultural terms, compare passwords with the cultural terms, and approve or deny the password based on the comparison. When the system "denies" a password because it is too similar to a cultural term, it does not necessarily mean the user cannot use the password. The system may warn the user that the password is insecure by sending a notification to a user device. In other examples, denying the password can mean that the password is blocked and cannot be used. In some examples, the system can also generate a more secure password and suggest it to the user.

In some examples, the system can store the cultural terms in a database for later retrieval by an identification system. The passwords can be stored in a database in, for example, plaintext, encrypted, hashed, or similar formats. The systems described herein can be used to compare passwords to cultural terms regardless of how the cultural terms and passwords are saved, for example, by applying the same encryption keys or hash functions to both the passwords and the cultural terms. In other words, the hashed version of the password can be compared to hashed versions of cultural terms to identify similarities.

The systems described herein also provide certain thresholds that enable a user to have a cultural-password, provided that the password is sufficiently different. Using the "Taylor Swift" example from above, the system can determine if the password is too similar to the celebrity's name by calculating a similarity score between the password and the name. If enough characters are changed and/or added to the name, for example, the password may not be compromised despite being somewhat similar to the name. The similarity score is described in greater detail below.

Reference will now be made in detail to exemplary examples of the disclosed technology, examples of which are illustrated in the accompanying drawings and disclosed herein. Wherever convenient, the same references numbers will be used throughout the drawings to refer to the same or like parts.

Figure 1:
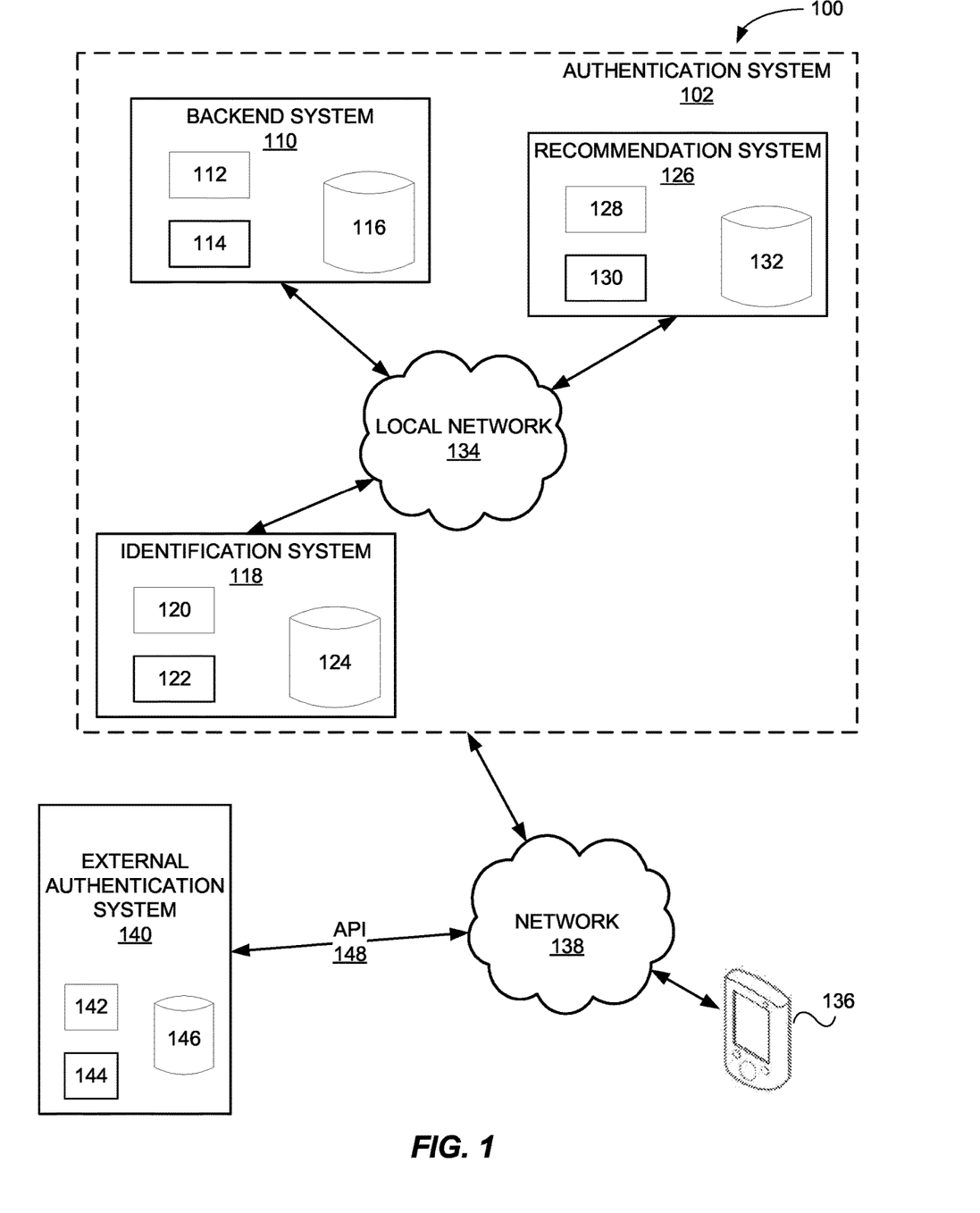
FIG. 1 is a diagram of an example of a system that can be used to implement one or more examples of the present disclosure.

FIG. 1 is a diagram of an example system 100 that can be used to implement one or more examples of the present disclosure. A more detailed explanation of some of the components of the system 100 are described below with reference to FIGS. 8 and 9. It is beneficial, however, to provide a brief overview to describe the components of the systems and methods for identifying password insecurities described herein.

The system 100 can include an authentication system 102, which can be associated with a company or entity that enables users to log in to an account. The authentication system 102, for example, can be an online retailer, banking institution, social media site, or any other service that provides access using passwords. As discussed below, the authentication system 102 can also be a standalone service that can be used by external systems, such as, for example, an external authentication system 140, to assess password security.

The authentication system 102 can include a backend system 110 that includes a database 116 for storing cultural terms and/or passwords. The backend system 110 can also include one or more processors 112 that enables the backend system 110 to crawl websites, and review other data, to identify cultural terms to be stored in the database 116.

The authentication system 102 can include an identification system 118 that also includes one or more processors 120. The one or more processors 120 can receive a password, access the database 116 of the backend system 110, and compare the password with the cultural terms stored in the database 116. In some examples, the authentication system 102 can transmit a notification to a recommendation system 126 indicating that a password is denied because it is too similar to a cultural term (e.g., by using a similarity score). The recommendation system 126 can also include one or more processors 128 that can be used to generate a suggested password that is more secure than the denied password.

The backend system 110, identification system 118, and recommendation system 126 can communicate with each other via a wired or wireless local network 134. In some examples, the backend system 110, identification system 118, and/or recommendation system 126 can all be associated with the same entity (e.g., a single bank or internet service provider). In other examples, any, or all, of the components can be associated with different entities.

The authentication system 102 can communicate with a user device 136 via a wired or wireless network, for example network 138. In this example, the authentication system 102 can receive a password directly from a user logging into an account associated with the authentication system 102. The authentication system 102 can be associated with an online retailer, for example, enabling the retailer to evaluate the password strength of its account holders. In other examples, the authentication system 102 can communicate with an external authentication system 140 via the wired or wireless network 138. In this example, the authentication system 102 can act as a security clearinghouse for third parties to ensure the third party has secure passwords across all of their user accounts.

Figure 2:
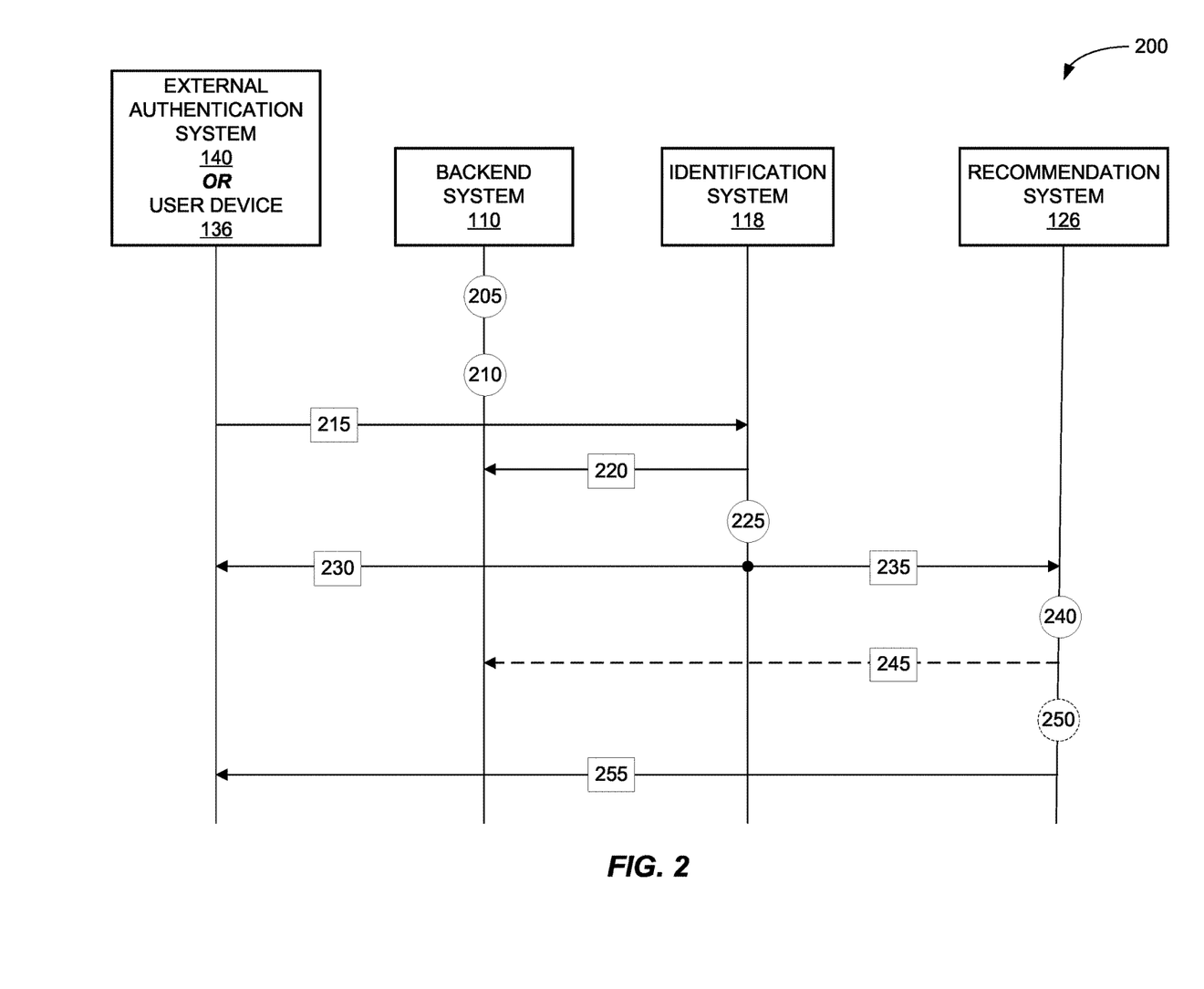
FIG. 2 is a timing diagram of an example of a method for identifying and remedying password insecurity, according to some examples of the present disclosure.

FIG. 2 is a timing diagram of a method 200 for identifying and remedying password insecurity, according to some examples of the present disclosure. At 205, the backend system 110 of the authentication system 102 can search a plurality of websites to identify cultural terms. The backend system 110 can search websites using a web crawler, for example, or store a predetermined list of Uniform Resource Locators (URLs) to search. In other examples, the backend system 110 can compile a list of popular URLs by simply performing web searches. So, for example, the web crawler can identify that a subset of websites, including websites A and B, include terms that are popular across numerous websites (e.g., urbandictionary.com) and thus, may comprise a reliable source of cultural terms. The backend system 110 can then save the URLs for websites A and B to a list for future searching.

The backend system 110 can also crawl websites associated with specific subject matter to identify specific cultural terms. The backend system 110 can crawl music sites, for example, to identify musicians, musical acts, song titles, lyrics, etc. that qualify as cultural terms. Similarly, the backend system 110 can crawl news sites (e.g., to identify politicians, current events, or political terms), movie and television sites (e.g., to identify actors and popular movies), and/or sports sites (e.g., to identify popular athletes or sports teams).

After crawling the websites, the backend system 110 can determine if one or more terms in the search should be qualified as a cultural term. This can be completed, for example, by determining if the term or a variation of the term was found a predetermined number of times and/or consistently over a certain period of time. If the backend system 110 searches the plurality of websites and identifies the term "Beatles" and/or "The Beatles" more than a certain number of times, that term can be saved as a cultural term.

The threshold can be any suitable number that enables cultural terms to be identified without being unmanageable. If running a search on a particular cultural term with a threshold of 1,000 hits, for example, comes back with an excessive or unmanageable number of results, the threshold may be too low. This may cause the search to return less popular cultural terms and overly limit the number of possible passwords. In this case, the threshold can be reset to a higher number (e.g., 10,000, 100,000, 1,000,000, or more) to produce a more manageable list. The backend system 110 can also identify cultural terms based on the prevalence of the term over a period of time. If the backend system 110 searches the plurality of websites and identifies the terms "Beatles" and/or "The Beatles," a relatively low number of times (e.g., 1,000 times), for example, the backend system 110 can then determine how long the term has appeared (e.g., using search histories). If the backend system 110 determines that the term has been popular for a sufficient amount of time, the term can be identified a cultural term. Similarly, if the backend system 110 runs the search again later and the number of hits either increases or stays constant, for example, the term can also be identified a cultural term.

At 210, the backend system 110 can save the identified cultural terms in a database (e.g., database 116). The cultural terms can be saved in any number of formats including, but not limited to, plaintext, encrypted, or hashed formats. In some examples, the cultural terms can be saved in the same format as the passwords on the system 100.

At 215, an identification system 118 can receive a password. The password can be received from a variety of devices, including a user device 136 or an external authentication system 140. If the password is received from the user device 136, for example, the user device 136 can be associated with the authentication system 102 associated with a website that stores user accounts and passwords. In other examples, the password can be received from the external authentication system 140 using the authentication system 102 as an "outside service" to check the security of passwords. The password can also be received from the backend system 110 (e.g., from the database 116 of the backend system 110). The stored passwords can be periodically checked with the authentication system 102, for example, for continued security. This can help to identify passwords that become cultural terms as more cultural terms are added to the database 116.

At 220, the identification system 118 can access the database of the backend system 110 to retrieve the cultural terms and to receive passwords. This can enable the authentication system 102 to actively monitor the security of stored passwords on the back end, as opposed to waiting to receive a password on the front end (e.g., from the user device 136 or external authentication system 140).

At 225, the identification system 118 can compare the password with the cultural terms saved at the backend system 110. The cultural terms and/or passwords can be stored in the database of the backend system 110 in, for example, plaintext, encrypted, hashed, or similar formats. If the cultural terms are saved in plaintext format, no other function is required to decrypt or translate the terms.

The database of the backend system 110 can also include security measures that protect the cultural terms and/or passwords saved in the database 116. In this case, the system may need to complete additional steps to compare the password with the cultural terms. The passwords and/or cultural terms stored in the database can be encrypted, for example. Encryption enables a system to receive a plaintext term, encrypt the term with an encryption key, and then store the encrypted version of the term. The backend system 110 can encrypt the cultural terms using a first encryption key. At 225, the identification system 118 can compare the password with the encrypted cultural terms by either (1) decrypting the encrypted cultural terms using the first encryption key and comparing the plaintext cultural terms with the plaintext password or (2) encrypting the password with the first encryption key and comparing the encrypted password with the encrypted cultural terms.

Another example of securing the passwords and/or cultural terms includes hashing the terms with a hash function. This includes taking an input, like a plaintext term, and applying a hash function to the input to create a "hashed" term. Hashed terms using the same hash function can have the same number of characters. Unlike encryption, hashing a term only operates in one direction; a system cannot take the hashed term and turn it back into the plaintext version (i.e., there is no "decryption"). This characteristic makes hash functions a desirable method for securing passwords. In the case of a backend system 110 that stores hashed cultural terms and/or hashed passwords, at 225 the identification system 118 can compare the received password with the hashed cultural terms by (1) hashing the password with the same hash function used on the cultural term and (2) comparing the hashed password with the hashed cultural term.

The ability to compare cultural terms and passwords that are not in plaintext format is a significant improvement to the technical field of password security systems. Comparing passwords or cultural terms that are saved as plaintext may be straight forward, but comparing terms that are altered in some way requires a degree of processing that can be achieved by the algorithms and methods described in the present disclosure.

The identification system 118 can compare the similarity of the password and the stored cultural terms by determining if the received password is exactly the same as the cultural term. In this example, the identification system 118 can access the database 116 to determine if the password "BobMarley," for example, is found verbatim as a saved cultural term. The identification system 118 can also apply a more conservative approach. The system can enable a user to adopt a cultural-password provided that a quantity of matching characters between the password and the cultural term is below a certain threshold. Alternatively, the system can enable a user to adopt a cultural-password provided that a quantity of different characters is above a certain threshold. This can be completed by calculating the similarity scores described with reference to FIG. 3.

After comparing the password with the cultural terms at 225, the identification system 118 can either approve or deny the password. At 230, the identification system 118 approves the password. Approving the password can enable the user to adopt or continue using that password. Denying the password can prohibit the user from using the password, for example by deactivating the password or requesting the user to provide a different password. In other examples, a recommendation system 126 can generate a suggested password.

At 235, the received password is denied, and the identification system 118 transmits a notification to the recommendation system 126 indicating that the password has been denied. The systems described herein can periodically monitor passwords saved at the backend system 110. In these cases, the identification system 118 can deactivate the denied password when the notification is transmitted.

At 240, the recommendation system 126 can generate a suggested password. The suggested password can be a random human-readable password. A human-readable password can be a term or phrase that includes one or more common words. Humans prefer readable strings of characters that make the password easy to remember. These readable strings can include common words such as "vacation," "alphabet," and/or any other common word or combination of common words. The human-readable password can also be a variation of the common word that includes numbers and/or special characters in the place of a letter (e.g., "@lphab3t" instead of "alphabet"). To create the random human-readable password, the recommendation system 126 can include one or more processors (e.g., processor 128) that generates the passwords from a list of common terms stored in a database 132 associated with the recommendation system 126.

At 245, the recommendation system 126 can access the backend system 110 to retrieve the cultural terms. At 250, the recommendation system 126 can then compare the suggested password to the cultural terms. These steps can be similar to 220 and 225 where the identification system 118 compared the password with the cultural terms. By comparing the suggested password against the cultural terms, the system 100 can ensure that what was an ordinary, common human-readable term does not grow in popularity over time to become a cultural term. The password terms "president" or "pre$id3nt," for example, can be common terms for three years but can be identified as a cultural term during an election year. As discussed below with reference to FIG. 4, the recommendation system 126 can also access the backend system 110 to retrieve two cultural terms and combine them to create the suggested password.

At 255, the recommendation system 126 can transmit the suggested password to the user device 136 and/or the external authentication system 140. The user can adopt the suggested password or attempt a new password, and the new password can be sent back through the system to ensure the new password is approved by the system 100.

Figure 3:
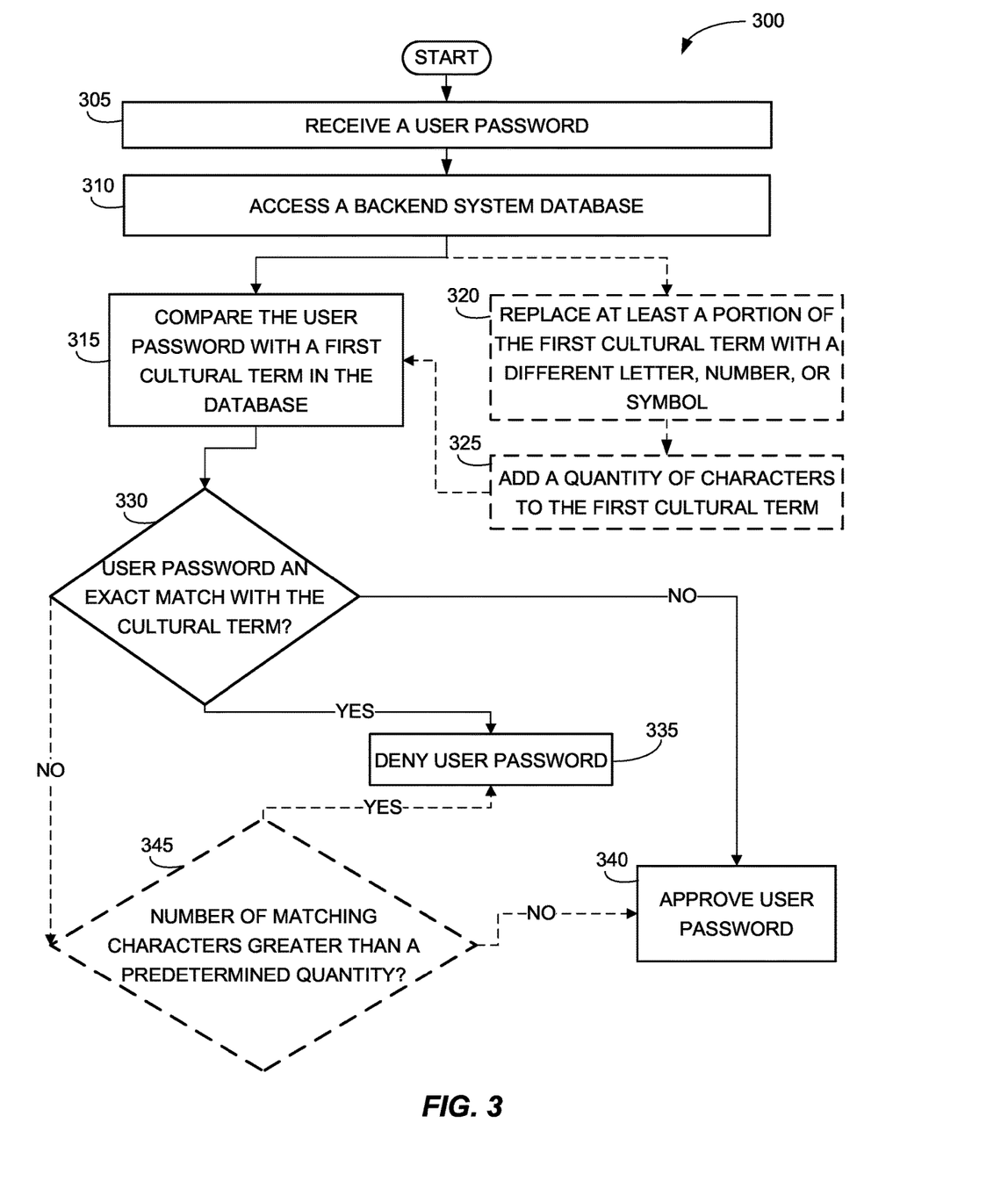
FIG. 3 is a flowchart depicting an example of a method for comparing passwords to cultural terms based on a similarity score, according to some examples of the present disclosure.

FIG. 3 is a flowchart depicting an example method 300 of comparing passwords to cultural terms based on a similarity score, according to some examples of the present disclosure. Method 300 can be performed in whole or in part by the components of the identification system 118 or the recommendation system 126. Method 300 can include similar steps to those described above with reference to 225 and 250 in FIG. 2.

Method 300 can begin at block 305, which includes receiving a password. The password can be received from a user device (e.g., user device 136), from an external system (e.g., external authentication system 140), and/or from a backend system (e.g., backend system 110). The user device or the external system may be considered a frontend, and a user can be entering the password to access a site or can be entering the password to create a new password at this step. A password received from the external authentication system 140 can be referred to as an "external password." If the password is received from the backend system, the system may be accessing previously-created passwords to assess whether the passwords remain secure.

At block 310, method 300 includes accessing a backend system database (e.g., database 116) to identify the cultural terms. At block 315, method 300 includes comparing the password with a first cultural term in the database. The password, of course, can be compared to any number of cultural terms stored in the database.

In some examples, instead of comparing the password to the cultural term verbatim, the password and/or cultural terms can be modified to determine if the password is a variation of the cultural term. The password may be "T@ylor$wift1234," for example, and the system can determine if that password is a variation or modification of a cultural term in the database. At block 320, method 300 can include replacing at least a portion of the first cultural term with a different letter, number, or symbol. A symbol can include special characters like !, @, #, $, %, etc. The term "T@ylor$wift1234" includes a modification to the "a" in Taylor by replacing the letter with the symbol "@." The system can modify at least a portion of "TaylorSwift" and then method 300 can proceed to block 315, where the password can be compared to the modified cultural term. In some examples, the password can be modified according to this process and then be compared to the cultural terms. If the password is "T@ylor$wift," for example, the system can modify the password by replacing the "@" or the "$" and then compare the modified password to cultural terms in the database.

The cultural term can be modified by adding characters (e.g., letters, numbers, or symbols) to the cultural term, as shown at block 325. The term "T@ylor$wift1234" includes the modification of adding the characters "1234" to the term "T@ylor$wift." The system can add the additional characters to the cultural term and then method 300 can proceed to block 315, where the password can be compared to the modified cultural term. Again, the password can instead be modified according to this process and then can be compared to the cultural terms.

The identification system 118 and/or recommendation system 126 can complete the modifications of the cultural term and/or password. In some systems, the backend system 110 can modify the cultural terms before the identification system 118 and/or recommendation system 126 accesses the database, thereby relieving the identification system 118 and/or recommendation system 126 of some of the processing requirements. The present systems can also compare encrypted or hashed terms by applying the same encryption key or hash function to both the password and cultural terms.

The similarity score described in FIG. 3 can have various levels of strictness. In one example, and as shown at block 330, method 300 can include determining whether the password is an exact match with the cultural term, i.e., the system approves passwords if they are not found verbatim in the database. If the term is stored in the database, method 300 includes denying the password at block 335; if the term is not stored in the database, method 300 includes approving the password at block 340.

In some examples, instead of basing the approval/denial of the password solely on whether there is an exact match to a cultural term, the system can instead provide a threshold of similar or different characters that are permitted by the system. The system can approve a password if a quantity of matching characters is less than a predetermined quantity and, conversely, deny the password if the quantity of matching characters is greater than the predetermined quantity. Accordingly, at block 345, method 300 can include determining if a number of matching characters between the password and the cultural term is within those thresholds. The password can include "T@ylor$wift1234," for example, and the cultural term stored at the backend system 110 can include the term "Taylor Swift." Between these two terms, the characters "T," "ylor," and "wift" are similar, matching characters, for a total of nine matching characters. If the system has a maximum quantity of eight matching characters, the system can deny the password at block 335. Alternatively, if the system has a maximum quantity of nine or more matching characters, the system can approve the password at block 340. This system enables a user to adopt common terms that may be easy for them to remember, provided that the password is sufficiently different than the common terms.

The threshold at block 345 can also be described in terms of differences between the password and the first cultural term. The system can instead approve the password if a predetermined number of differences between the two terms is greater than a minimum quantity of differences; the system can deny the password if a number of differences between the two terms is less than the minimum. To illustrate using the example above, the password can include "T@ylor$wift1234," and the cultural term stored at the backend system 110 can include the term "Taylor Swift." The differences between the two terms include: (1) the change of the "a" to "@," (2) the deletion of the space between the first and last name, (3) the change of the "S" to "$", and (4) the addition of four numbers, for a total of seven differences between the cultural term and the password. If the system requires a minimum of eight differences, for example, the system can deny the password at block 335. Alternatively, if the system requires a minimum of seven or fewer differences, the system can approve the password at block 340.

The predetermined maximum similarities and/or minimum differences can be altered if the system is encrypting or hashing the terms. The term "president," for example, includes nine characters, but the encrypted or hashed version of the term may have more or less characters. The system can adjust the predetermined minimum- or maximum-thresholds based on the characteristics of the encryption key or the hashing function. Again, this is a significant improvement to the technical field of password security systems. Such an adjustment would not be possible without a computing system that can encrypt or hash the terms.

Figure 4:
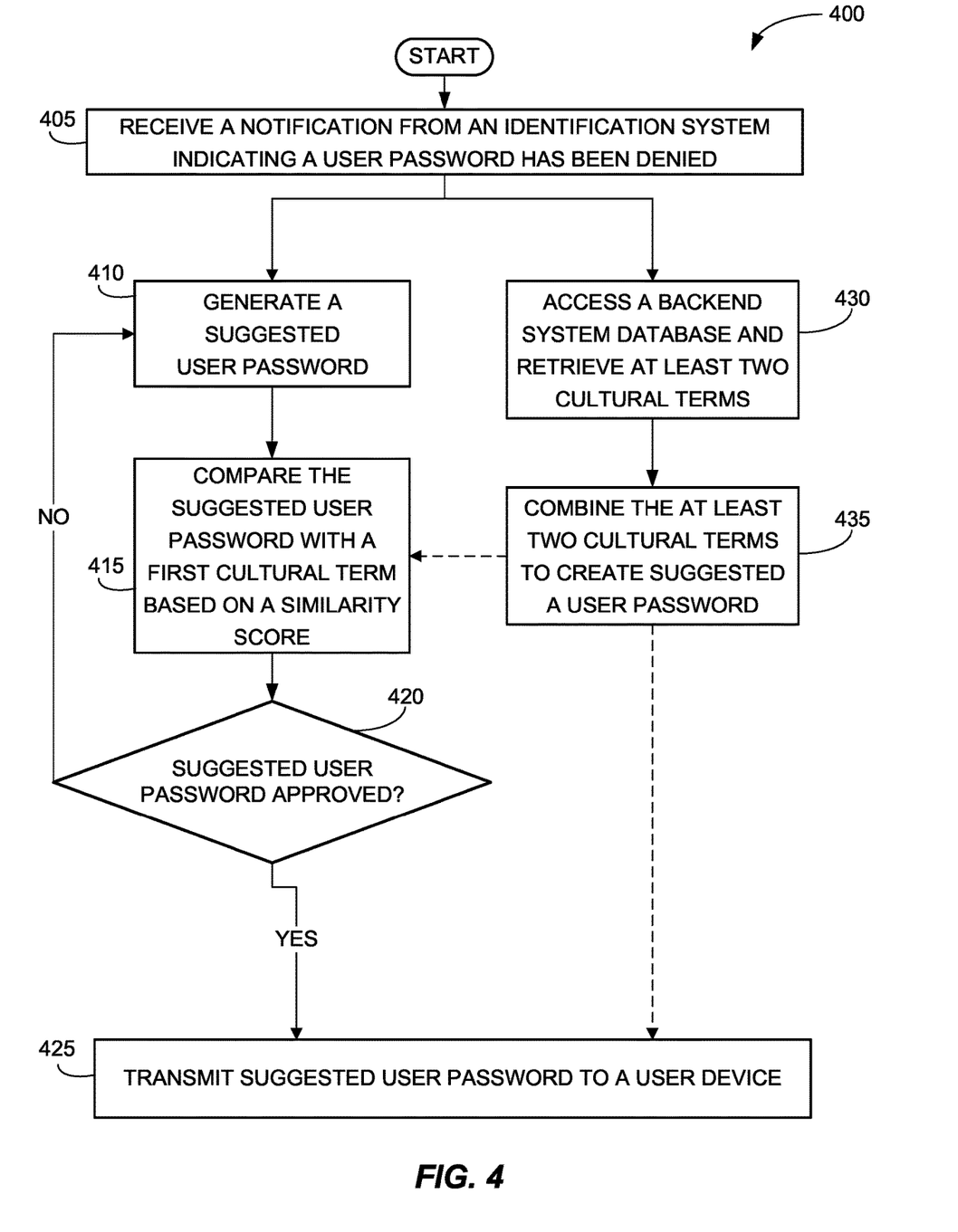
FIG. 4 is a flowchart depicting an example of a method for generating a suggested password, according to some examples of the present disclosure.

FIG. 4 is a flowchart depicting an example method 400 of generating a suggested password, according to some examples of the present disclosure. Method 400 can be performed in whole or in part by the components of the recommendation system 126 described herein. Method 400 can begin at block 405, which includes receiving a notification from the identification system 118 indicating a password has been denied. This step can be similar to 235 in FIG. 2.

At block 410, method 400 can include generating a suggested password. The recommendation system 126 can generate the suggested password by combining random letters, numbers, or special characters. The random string of characters can be entirely random and not resemble a word, similar to the random characters in a CAPTCHA. Humans prefer easy-to-remember passwords, which oftentimes means that users prefer human-readable phrases that resemble words (e.g., the "@lphab3t" example described above). The recommendation system 126 can, therefore, generate the suggested password to include a human-readable string of characters, as described above in reference to 240 in FIG. 2.

If the suggested password includes a human-readable string of characters, the term could run afoul of terms saved as cultural terms. Accordingly, at block 415, method 400 can include comparing the suggested password with a first cultural term based on a similarity score. Block 415 can be similar to method 300 described with reference to FIG. 3.

At block 420, method 400 can include determining, based on the similarity score, if the suggested password should be approved. If the suggested password is approved, method 400 can include transmitting the suggested password to a user device (e.g., user device 136) and/or an external system (e.g., external authentication system 140). If the recommendation system 126 determines, based on the similarity score, that the suggested password should be denied, the recommendation system 126 can generate a second suggested password at block 410. At block 425, method 400 can include transmitting the suggested password to a user device.

The suggested password can be created by using the cultural terms stored at the backend system 110. Passwords that combine two common terms in an uncommon or nonsensical way can be very secure passwords. The passwords "PabloPicasso" or "MartinScorsese" may be easy to break because a hacker only needs to input common phrases (e.g., celebrity names) into their password attack. The password "PabloScorsese," however, may be more secure because this is not a common phrase nor is it easily guessed. To this end, at block 430, method 400 can include accessing the backend system database and retrieving at least two cultural terms. At block 435, method 400 can include combining the at least two cultural terms to create the suggested password. Method 400 can then proceed to block 415, where the suggested password is compared to cultural terms based on the similarity score. At block 425, method 400 can include transmitting the suggested password to a user device. The recommendation system 126 can also encrypt or hash the suggested password with the same key or hash function described above to create a hashed suggested password.

Figure 5:
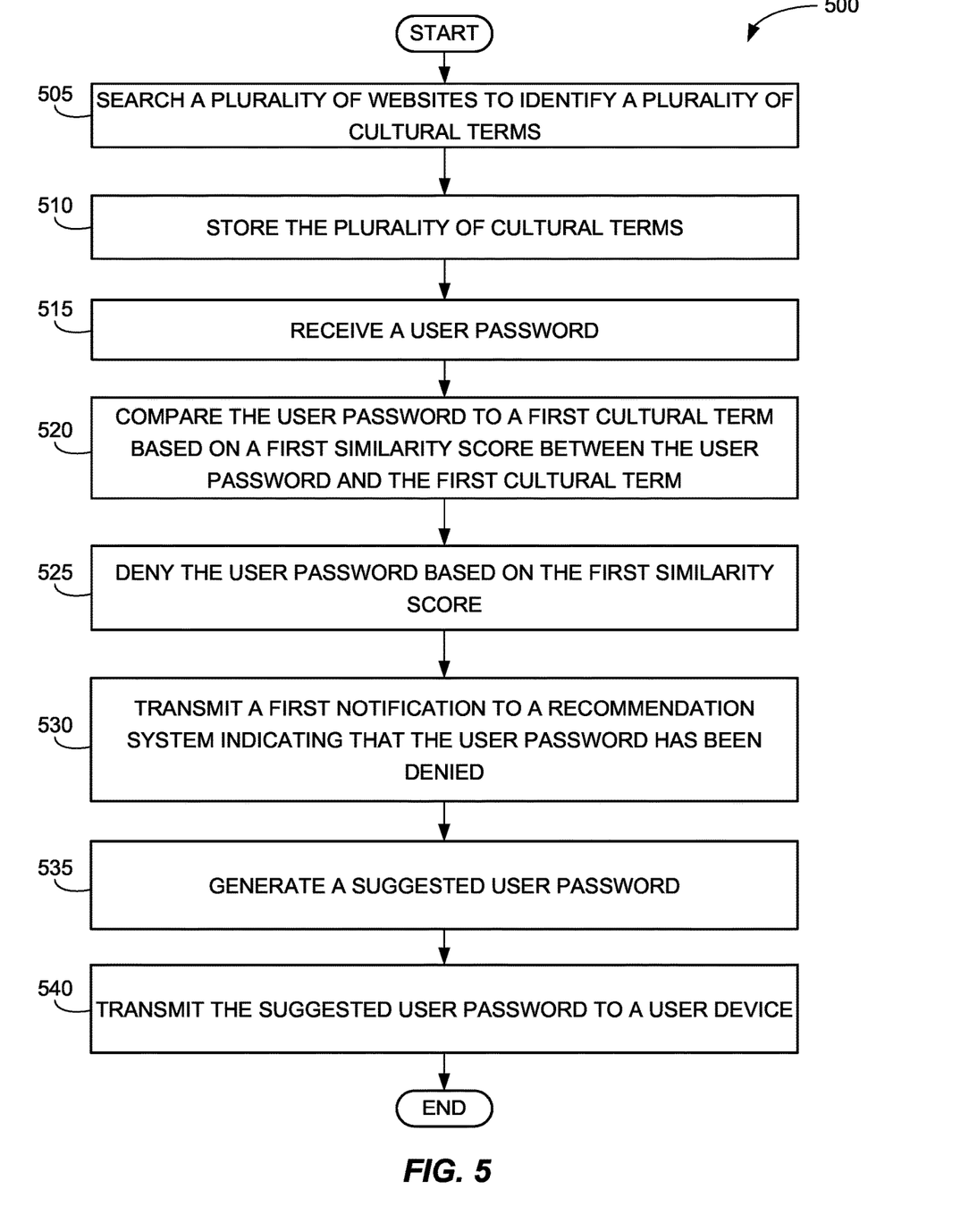
FIGS. 5 and 6 are flowcharts of examples of methods for identifying and remedying password insecurity, according to some examples of the present disclosure.

FIG. 5 is a flowchart of an example method 500 for identifying and remedying password insecurity, according to some examples of the present disclosure. Method 500 can be performed, for example, by the example authentication system 102 described in FIG. 1. Method 500 can begin at block 505, which includes searching a plurality of websites to identify a plurality of cultural terms. At block 510, method 500 can include storing, for example in a database 116 of a backend system 110, the plurality of cultural terms. The terms can be stored in, for example, plaintext, hashed, or encrypted formats.

At block 515, method 500 can include receiving a password. The password can be received from a frontend, such as from a graphical user interface (GUI) of a user device asking the user to input the password. The frontend can also include the frontend of third party system, for example an external authentication system 140. The third party system can communicate with the authentication system 102 via an application programming interface (API), for example API 148. The API can enable certain data (e.g., cultural terms saved in the backend system, approval or denial notifications of the password, and/or suggested passwords generated by the recommendation system 126) to be transferred between the systems, while preventing other data (e.g., passwords or accounts associated with the authentication system 102) from transferring between the systems. The API can also be employed in the steps described at 215 of FIG. 2 and at block 305 of FIG. 3.

At block 520, method 500 can include comparing the password to a first cultural term based on a first similarity score. This comparing step can be similar to the comparing steps shown at 225 in FIG. 2 and in method 300 of FIG. 3.

At block 525, method 500 can include denying the password based on the first similarity score. This denial could be based, for example, on the identification system determining that the password is exactly the same as a cultural term, a quantity of matching characters between the password and a cultural term is greater than a predetermined quantity, a quantity of different characters between the password and a cultural term is less than a predetermined quantity, and/or the like.

At block 530, method 500 can include transmitting a first notification to a recommendation system indicating that the password has been denied. At block 535, method 500 can include generating, with the recommendation system, a suggested password. The suggested password can be generated according to the example method 400 described with reference to FIG. 4.

At block 540, method 500 can include transmitting the suggested password to a user device or an external authentication system. Method 500 can end after block 540. In other examples, additional steps can be performed according to the examples described herein.

Figure 6:
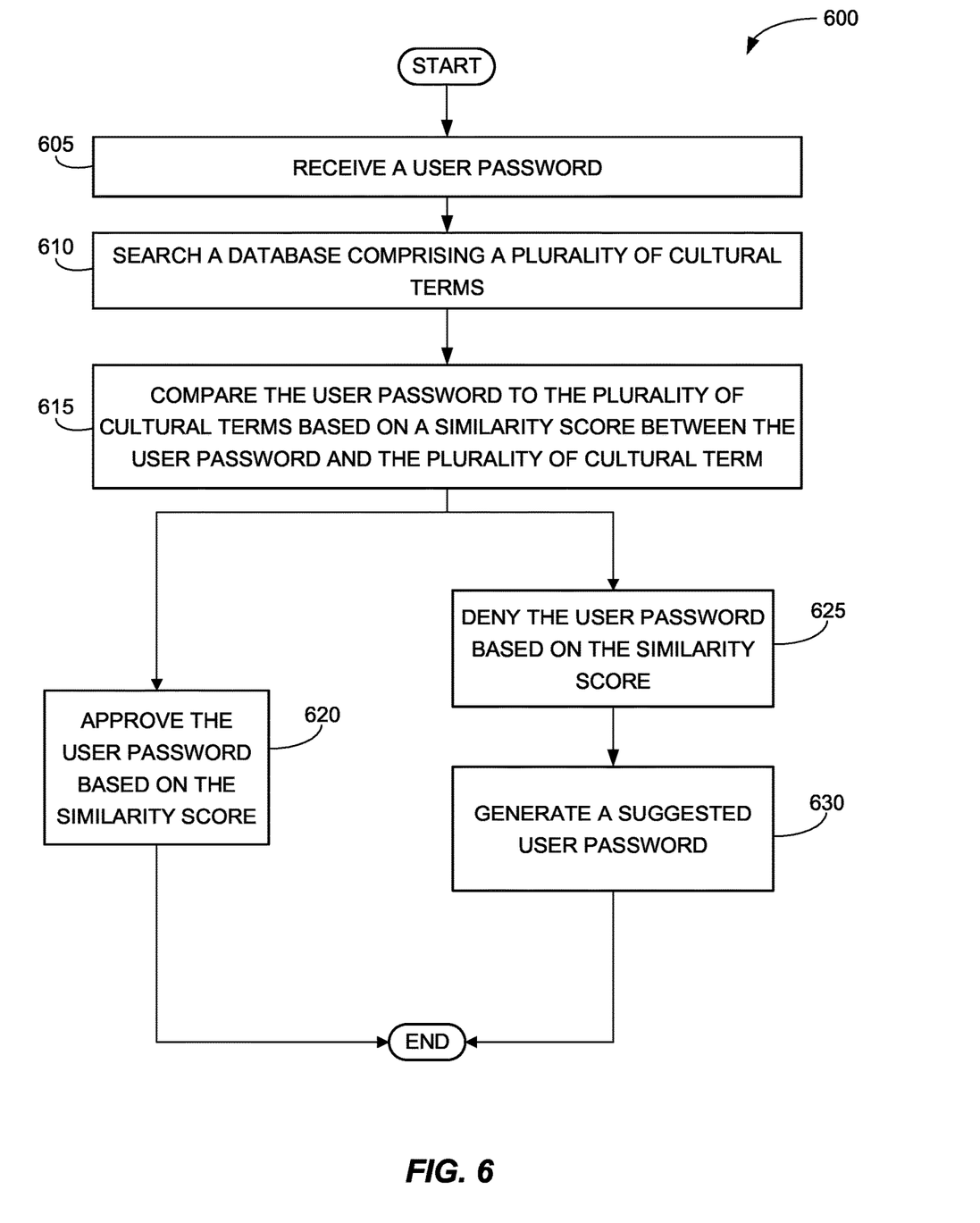

FIG. 6 is a flowchart of an example process 600 for identifying and remedying password insecurity, according to some examples of the present disclosure. Process 600 can be performed, for example, by the authentication system 102 described in FIG. 1. Process 600 can begin at block 605, which includes receiving a password. The password can be received from a user device, a backend system storing passwords, or an external authentication system.

At block 610, process 600 includes searching a database comprising a plurality of cultural terms. The database can be associated with the authentication system or it can be associated with a separate entity. A third-party entity can, for example, provide backend services that include searching for and storing cultural terms. The third-party entity can then enable external systems, such as the authentication system 102, to have access to the cultural terms.

At block 615, process 600 includes comparing the password to the plurality of cultural terms based on a similarity score between the password and the plurality of cultural terms. The similarity score can be calculated based on the example method 300 described with reference to FIG. 3. In some examples, the password can be hashed or encrypted prior to comparing the password with the cultural terms. After comparing the password to the plurality of cultural terms, the system can approve or deny the password.

At block 620, process 600 includes approving the password based on the similarity score. The identification system can determine that the password is not exactly the same as a cultural term from the plurality of cultural terms, that a quantity of matching characters between the password and a cultural term is less than a predetermined quantity, that a quantity of different characters between the password and a cultural term is greater than a predetermined quantity, and/or the like. Process 600 can end after block 620, and the user can proceed with the password.

Alternatively, at block 625, process 600 includes denying the password based on the similarity score. The identification system can determine that the password is exactly the same as a cultural term from the plurality of cultural terms, that a quantity of matching characters between the password and a cultural term is greater than a predetermined quantity, that a quantity of different characters between the password and a cultural term is less than a predetermined quantity, and/or the like.

At block 630, process 600 includes generating a suggested password. The suggested password can be generated by the example method 400 described with reference to FIG. 4. Process 600 can end after block 630. In other examples, additional steps can be performed according to the examples described herein.

Figure 7:
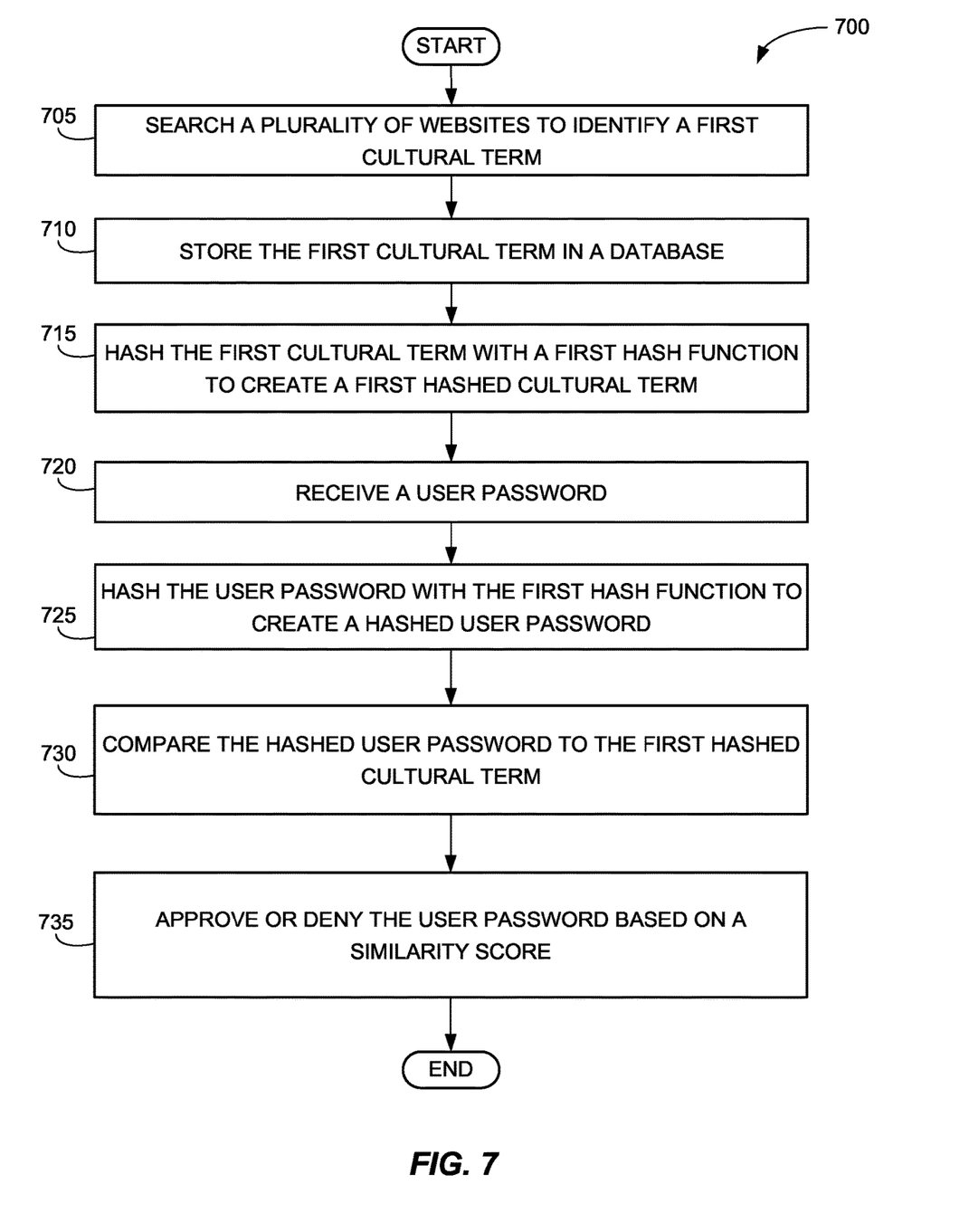
FIG. 7 is a flowchart of an example of a process for identifying password insecurity, according to some examples of the present disclosure.

FIG. 7 is a flowchart of an example process 700 for identifying password insecurity, according to some examples of the present disclosure. Process 700 can be performed by the authentication system 102 described in FIG. 1. Process 700 can begin at block 705, which includes searching a plurality of websites to identify a first cultural term. The websites can be searched according to the example steps described with reference to 205 in FIG. 2. A backend system, for example backend system 110, can use a web crawler to search a variety of websites to identify cultural terms.

At block 710, process 700 includes storing the first cultural term in a database. At block 715, process 700 can include hashing the first cultural term with a first hash function to create a first hashed cultural term. The first hash function can be applied to any quantity of cultural terms.

At block 720, process 700 includes receiving a password. At block 725, process 700 includes hashing the password with the first hash function to create a hashed password. At this point, both the password and the first cultural term have been hashed with the same hash function.

At block 730, process 700 includes comparing the hashed password to the first hashed cultural term. At block 735, process 700 includes approving or denying the password based on a similarity score. The similarity score can be calculated by using example method 300 in FIG. 3. An identification system can determine that the hashed password is exactly the same as the first hashed cultural term, that a quantity of matching characters between the hashed password and the first hashed cultural term is greater than a predetermined quantity, that a quantity of different characters between the hashed password and the first hashed cultural term is less than a predetermined quantity, and/or the like. In some examples, instead of using a hash function, process 700 can include encrypting the terms with an encryption key. Process 700 can end after block 735. In other examples, additional steps can be performed according to the examples described herein.

Referring again to the system 100 described in FIG. 1, the backend system 110 can include one or more processors 112, a memory 114, and data storage, for example in database 116. The identification system 118 can include one or more processors 120, a memory 122, and data storage, for example in database 124. The recommendation system 126 can include or more processors 128, a memory 130, and data storage, for example in database 132.

The authentication system 102 can comprise the backend system 110, the identification system 118, and the recommendation system 126 as a single device. In other examples, the backend system 110, the identification system 118, and the recommendation system 126 can be separate devices communicating with each other via a local network 134. The local network 134 can be of any suitable type, including individual connections via the internet such as wired or wireless networks. The wired networks can be an Ethernet network and the wireless networks can be cellular or WiFi™ networks, for example. In some examples, local network 134 can connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted can be personal or confidential (e.g., it can include passwords), the connections can also be encrypted or otherwise secured.

The authentication system 102 can communicate with external devices via a network 138, which can be similar to local network 134. The external devices that communicate with the authentication system 102 can include a user device 136 and/or an external authentication system 140, as described herein. The external authentication system 140 can include one or more processors 142, a memory 144, and data storage, for example in database 146. In some examples, and as described above, the authentication system 102 can communicate with the external authentication system 140 via an API 148. The API can enable the external authentication system 140 to access the services provided by the authentication system 102 while also safeguarding sensitive information stored within the authentication system 102.

Figure 8:
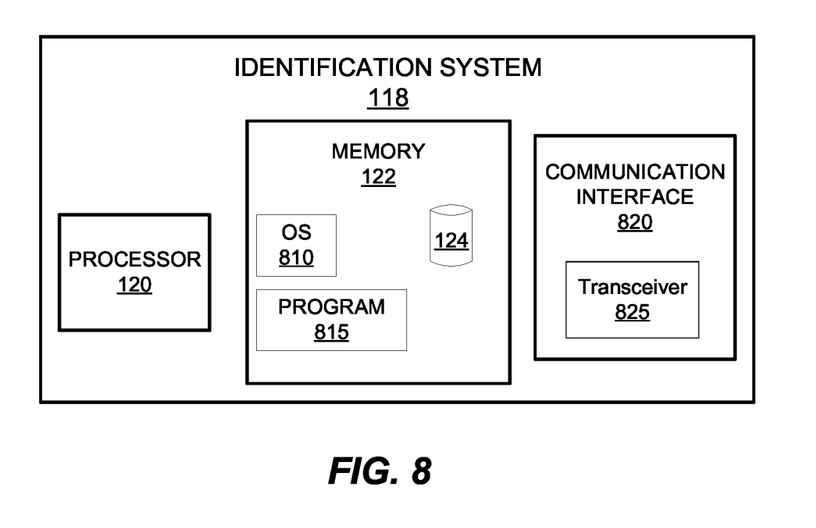
FIG. 8 is a component diagram of an example of an identification system, according to some examples of the present disclosure.

FIG. 8 is a component diagram of an example identification system 118, according to some examples of the present disclosure. FIG. 8 provides additional detail to the components of the identification system 118 shown in FIG. 1. As described above, the identification system 118 can include a processor 120. The processor 120 can include one or more of a microprocessor, microcontroller, digital signal processor, co-processor or the like or combinations thereof capable of executing stored instructions and operating upon stored data. The processor 112 of the backend system 110, the processor 128 of the recommendation system 126, and/or the processor 142 of the external authentication system 140 can be similar to processor 120.

As described above, the identification system 118 can include a memory 122. The memory 122 can include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. The memory 114 of the backend system 110, the memory 130 of the recommendation system 126, and/or the memory 144 of the external authentication system 140 can be similar to memory 122.

The memory 122 of the identification system 118 can contain an operating system ("OS") 810 that can run one or more programs 815. The one or more programs 815 can perform one or more functions of the disclosed examples. The one or more programs 815 can include, for example, an application for comparing the passwords to the cultural terms, for example by calculating the similarity scores described herein. The backend system 110, recommendation system 126, and/or external authentication system 140 can include an OS and/or one or more programs similar to those described for the identification system 118. One or more programs of the recommendation system 126, for example, can include an application for generating a suggested password, as described herein.

The memory 122 can also include any combination of one or more databases, including for example database 124, controlled by memory controller devices (e.g., server(s), etc.) or software, such as document management systems, Microsoft® SQL databases, SharePoint® databases, Oracle® databases, Sybase® databases, or other relational databases.

The identification system 118 can include a communication interface 820 for communicating with external systems or internal (e.g., within the authentication system 102) systems. The communication interface 820 can include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof. The communication interface 820 can include a transceiver 825 to communication with compatible devices. A transceiver 825 can be compatible with one or more of: radio-frequency identification (RFID), near-field communication (NFC), Bluetooth™, low-energy Bluetooth™ (BLE), WiFi™, ZigBee™, ambient backscatter communications (ABC) protocols, or similar technologies that enables the identification system 118 to communicate via the local network 134 and/or the network 138 described herein. The backend system 110, recommendation system 126, and/or external authentication system 140 can include any or all of the components described for the identification system 118.

Figure 9:
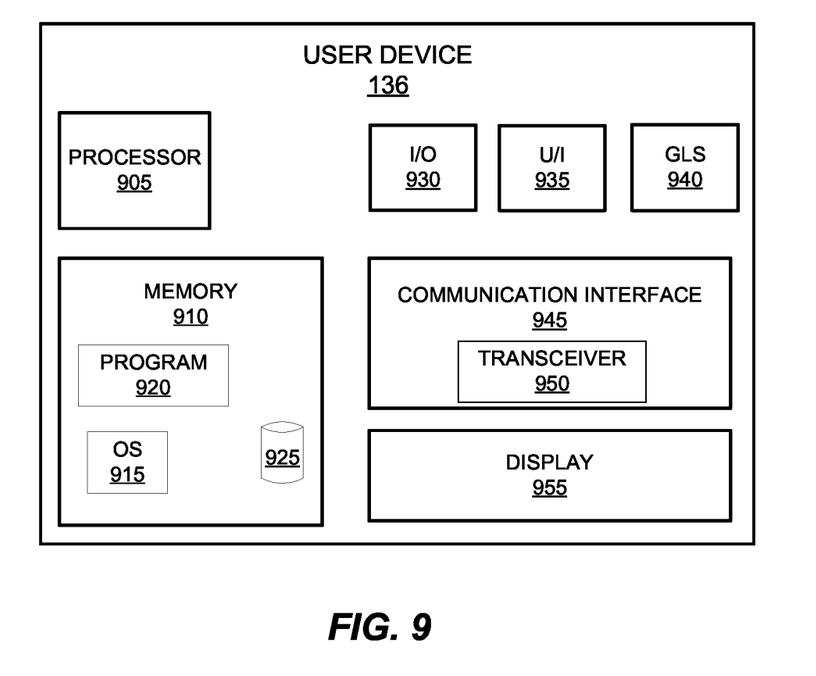
FIG. 9 is a component diagram of an example of a user device, according to some examples of the present disclosure.

FIG. 9 is a component diagram of an example user device 136 that can be used to enter a password for approval by the authentication system 102, according to some examples of the present disclosure. The user device 136 can be a mobile computing device (e.g., a smart phone, tablet computer, smart wearable (e.g., a smart watch), portable laptop computer, voice command device, wearable augmented reality device, or other mobile computing device) or a stationary device (e.g., desktop computer). The user device 136 can include a processor 905 similar to the processor 120 described above for the identification system 118. The user device 136 can also include a memory 910, operating system 915, one or more programs 920, and/or data storage 925, which can be similar to the memory 122, OS 810, one or more programs 815, or database 124, respectively, as described for the identification system 118. The user device 136 can also include a communication interface 945 that includes a transceiver 950, which can be similar to the communication interface 820 and transceiver 825 described above.

The operating system 915 can enable the user device 136 to operate the various applications described herein. A program 920, for example, can include an application associated with the authentication system 102. The authentication system 102 can be associated with an online retailer, banking institution, social media site, or any other digital service that has user accounts that are accessed by users entering a password. Accordingly, the program 920 can include an application enabling the user to log into or provide a password for the digital service. The operating system 915 can operate an account provider application that enables the user device 136 to display a GUI associated with the authentication system 102.

The user device 136 can also include one or more input/output ("I/O") devices 930 that can include one or more interfaces for receiving signals or input from devices and providing signals or output to one or more devices that allow data to be received and/or transmitted by the user device 136. For example, the user device 136 can include interface components, which can provide interfaces to one or more input devices, such as one or more keyboards, mouse devices, touch screens, track pads, trackballs, scroll wheels, digital cameras, microphones, sensors, and the like, that enable the user device 136 to receive data from one or more users.

The user device 136 can also include a user interface ("U/I") device 935 for receiving user input data, such as data representative of a click, a scroll, a tap, a press, or typing on an input device that can detect tactile inputs. According to some examples, U/I device 935 can include some or all of the components described with respect to I/O device 930 above. The U/I device 935 can be defined as the "input" of the user device 136. The user device 136 can also include a geographic location sensor ("GLS") 945 for determining the geographic location of the user device 136.

The user device 136 can include a display 955. The display 955 can provide visual representation of the various websites, applications, and/or GUIs described herein. The display 955 can also be a U/I device 935 in the case that the user device 136 has touchscreen capabilities. In other words, in some examples the display 955 can be the "input" of the user device 136.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

The components described in this disclosure as making up various elements of the systems and methods are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Examples of the present disclosure can be implemented according to at least the following clauses:

Clause 1: A method for identifying and remedying password insecurity, the method comprising: searching, with a backend system, a plurality of websites to identify a plurality of cultural terms; storing, in a database of the backend system, the plurality of cultural terms; receiving, at an identification system, a password; comparing, with the identification system, the password to a first cultural term based on a first similarity score between the password and the first cultural term; denying, with the identification system, the password based on the first similarity score; transmitting, from the identification system, a first notification to a recommendation system indicating that the password has been denied; generating, with the recommendation system, a suggested password; and transmitting, from the recommendation system, the suggested password to a user device.

Clause 2: The method of clause 1, further comprising: deactivating, with the identification system, the password when the password has been denied.

Clause 3: The method of any of clauses 1-2, wherein generating the suggested password comprises: generating, with the recommendation system, a first random human-readable password; comparing, with the recommendation system, the first random human-readable password to the first cultural term based on a second similarity score between the password and the first random human-readable password; and either: approving, with the recommendation system, the first random human-readable password based on the second similarity score; or denying, with the recommendation system, the first random human-readable password based on the second similarity score; and generating, with the recommendation system, a second random human-readable password.

Clause 4: The method of any of clauses 1-3, wherein receiving a password comprises at least one of: receiving, at the identification system, the password from a user device logging into an account associated with the identification system; or receiving, with the identification system, the password from a plurality of passwords stored in the database.

Clause 5: The method of any of clauses 1-4, further comprising: hashing, by the backend system, the first cultural term with a first hash function to create a first hashed cultural term; and hashing, with the identification system, the password with the first hash function to create a hashed password; wherein comparing the password to the first cultural term comprises comparing the hashed password to the first hashed cultural term.

Clause 6: The method of any of clauses 1-5, wherein: the first similarity score is determined by calculating a quantity of matching characters between the password and the first cultural term; and the password is denied if the quantity of matching characters is greater than a predetermined quantity.

Clause 7: The method of clause 6, further comprising: replacing at least a portion of characters in the first cultural term with a different letter, number, or symbol to create a modified cultural term; or adding one or more characters to the first cultural term to create the modified cultural term; wherein calculating the quantity of matching characters between the password and the first cultural term comprises calculating a quantity of matching characters between the password and the modified cultural term.

Clause 8: A system for identifying and remedying password insecurity, the system comprising: one or more processors; and a memory in communication with the one or more processors and storing instructions that, when executed by the one or more processors, cause the system to: receive a password; search a database comprising a plurality of cultural terms; compare the password to the plurality of cultural terms based on a similarity score between the password and the plurality of cultural terms; and either: approve the password based on the similarity score; or deny the password based on the similarity score; and generate a suggested password.

Clause 9: The system of clause 8, wherein: the instructions further cause the system to communicate with an external authentication system via an application programming interface; and the password is received from the external authentication system.

Clause 10: The system of any of clauses 8-9, wherein: the plurality of cultural terms is hashed with a first hash function; and the instructions further cause the system to hash the password with the first hash function and prior to comparing the password to the plurality of cultural terms.

Clause 11: The system of any of clauses 8-10, wherein: the similarity score is determined by calculating a quantity of matching characters between the password and plurality of cultural terms; and the password is denied if the quantity of matching characters is greater than a predetermined quantity.

Clause 12: The system of any of clauses 8-11, wherein generating the suggested password comprises combining at least a portion of a first cultural term with at least a portion of a second cultural term of the plurality of cultural terms.

Clause 13: A system for identifying password insecurity, the system comprising: one or more processors; and a memory in communication with the one or more processors and storing instructions that, when executed by the one or more processors, cause the system to: search a plurality of websites to identify a first cultural term; store the first cultural term in a database; hash the first cultural term with a first hash function to create a first hashed cultural term; receive a password; hash the password with the first hash function to create a hashed password; compare the hashed password to the first hashed cultural term; and approve or deny the password based on a similarity score.

Clause 14: The system of clause 13, wherein, when the password has been denied by the system, the instructions further cause the system to: generate a suggested password comprising a human-readable string of characters; and transmit the suggested password to a user device.

Clause 15: The system of clause 14, wherein the instructions further cause the system to: hash the suggested password with the first hash function to create a hashed suggested password; compare the hashed suggested password to the first hashed cultural term; and approve the suggested password based on the similarity score.

Clause 16: The system of any of clauses 14-15, wherein generating the suggested password comprises combining at least a portion of a second cultural term with at least a portion of a third cultural term from the database.

Clause 17: The system of any of clauses 13-16, wherein receiving the password comprises: receiving the password from a user device logging into an account associated with the system; or
receiving the password from a plurality of passwords stored in the database.

Clause 18: The system of any of clauses 13-17, wherein: the password is an external password, and to receive the password, the instructions further cause the system to: communicate with an external authentication system via an application programming interface; and receive, from the external authentication system, the external password.

Clause 19: The system of any of clauses 13-18, wherein: the similarity score is determined by calculating a quantity of matching characters between the password and the first cultural term; and the password is denied if the quantity of matching characters is greater than a predetermined quantity.

Clause 20: The system of clause 19, wherein the instructions further cause the system to: replace at least a portion of characters in the first cultural term with a different letter, number, or symbol to create a modified cultural term; or add one or more characters to the first cultural term to create the modified cultural term; wherein calculating the quantity of matching characters between the password and the first cultural term comprises calculating a quantity of matching characters between the password and the modified cultural term.

Exemplary Use Cases

The following exemplary use cases describe examples of a typical user flow pattern. They are intended solely for explanatory purposes and not limitation.

Account holder, Christie, wishes to enter a new password for her new banking account. Christie enters her username and enters the password "H@milt0n2020," since she is a fan of the musical and it is easy to remember. An identification system of the banking website receives the password and accesses a backend system storing cultural terms. The identification system then compares "H@milt0n2020" to the saved cultural terms and identifies the term "Hamilton." The identification system then calculates a similarity score between the attempted password and the cultural term. The similar characters between the two terms is "h," "milt," and "n," for a total of six similar characters. The identification system has a maximum similarity of five characters, and therefore denies the password.

The identification system then transmits a notification to a recommendation system indicating the password was denied. The recommendation system then generates the suggested password, "$tr@wBerry," an example of a human-readable password, and transmits the suggested password to Christie's user device. Christie can adopt the suggested password or try a new password.

In another example case, the recommendation system instead generates the suggested password, "p@ra$ite." The recommendation system accesses the backend system and compares "p@ra$ite" to the cultural terms saved therein. The recommendation system identifies that the term "Parasite" is saved as a cultural term because it is a popular movie. The recommendation system calculates a similarity score and identifies the similar characters to include "p," "ra," and "ite," for a total of six similar characters. The recommendation system also has a maximum similarity of five characters, and therefore denies the suggested password. The recommendation system creates a new suggested password, "$tr@wBerry," compares it to the cultural terms, and approves the password. The password "$tr@wBerry" is then transmitted to Christie's user device.

In a similar example case, Christie enters her username and enters the password "H@milt0n2020." The identification system of the banking website receives the password and accesses the backend system storing cultural terms. The identification system then compares "H@milt0n2020" to the saved cultural terms and identifies the term "Hamilton." The identification system then calculates a similarity score between the attempted password and the cultural term. The differences between the characters includes: (1) changing the "a" to an "@," (2) changing the "o" to an "0," and (3) adding the characters "2020," for a total of six differences. The identification system has a minimum difference threshold of six different terms, and therefore approves the password for use because it is not overly similar to "Hamilton."

In another exemplary use case, Lisa wishes to enter a new password for her new social media account. Lisa enters a username and enters the password "Be@tles1964," since she is a fan of the band and it is easy to remember. The identification system of the social media sites receives the password, hashes the password, and compares the hashed password to hashed cultural terms saved in the backend system. Using the same process as described above for Christie, the social media system can compare the hashed cultural terms with the hashed password using a similarity score to approve or deny Be@tles1964. In other words, the hashed versions of the password and the cultural terms will have the same number of similarities and differences.

What is claimed is:

1. A method for identifying and remedying password insecurity, the method comprising:
    searching, with a backend system, a plurality of websites to identify a plurality of cultural terms;
    storing, in a database of the backend system, the plurality of cultural terms;
    receiving, at an identification system, a password;
    comparing, with the identification system, the password to a first cultural term based on a first similarity score between the password and the first cultural term;
    denying, with the identification system, the password based on the first similarity score;
    transmitting, from the identification system, a first notification to a recommendation system indicating that the password has been denied;
    generating, with the recommendation system, a suggested password, wherein generating the suggested password comprises:
        generating, with the recommendation system, a first random human-readable password;
        comparing, with the recommendation system, the first random human-readable password to the plurality of cultural terms based on a second similarity score between the plurality of cultural terms and the first random human-readable password; and either:
            approving, with the recommendation system, the first random human-readable password based on the second similarity score;
            or
            denying, with the recommendation system, the first random human-readable password based on the second similarity score; and
            generating, with the recommendation system, a second random human-readable password; and
    transmitting, from the recommendation system, the suggested password to a user device.

2. The method of claim 1, further comprising:
    deactivating, with the identification system, the password when the password has been denied.

3. The method of claim 1, wherein receiving a password comprises at least one of:
    receiving, at the identification system, the password from a user device logging into an account associated with the identification system; or
    receiving, with the identification system, the password from a plurality of passwords stored in the database.

4. The method of claim 1, further comprising:
    hashing, by the backend system, the first cultural term with a first hash function to create a first hashed cultural term; and
    hashing, with the identification system, the password with the first hash function to create a hashed password;
    wherein comparing the password to the first cultural term comprises comparing the hashed password to the first hashed cultural term.

5. The method of claim 1, wherein:
    the first similarity score is determined by calculating a quantity of matching characters between the password and the first cultural term; and
    the password is denied if the quantity of matching characters is greater than a predetermined quantity.

6. The method of claim 5, further comprising:
    replacing at least a portion of characters in the first cultural term with a different letter, number, or symbol to create a modified cultural term; or
    adding one or more characters to the first cultural term to create the modified cultural term;
    wherein calculating the quantity of matching characters between the password and the first cultural term comprises calculating a quantity of matching characters between the password and the modified cultural term.

7. A system for identifying and remedying password insecurity, the system comprising:
    one or more processors; and
    a memory in communication with the one or more processors and storing instructions that, when executed by the one or more processors, cause the system to:
        communicate with an external authentication system via an application programming interface;
        receive a password from the external authentication system;
        search a database comprising a plurality of cultural terms;
        compare the password to the plurality of cultural terms based on a similarity score between the password and the plurality of cultural terms; and either:
            approve the password based on the similarity score; or
            deny the password based on the similarity score; and generate a suggested password.

8. The system of claim 7, wherein:
    the plurality of cultural terms is hashed with a first hash function; and the instructions further cause the system to hash the password with the first hash function and prior to comparing the password to the plurality of cultural terms.

9. The system of claim 7, wherein:
the similarity score is determined by calculating a quantity of matching characters between the password and plurality of cultural terms; and
the password is denied if the quantity of matching characters is greater than a predetermined quantity.

10. The system of claim 7, wherein generating the suggested password comprises combining at least a portion of a first cultural term with at least a portion of a second cultural term of the plurality of cultural terms.

11. A system for identifying password insecurity, the system comprising:
one or more processors; and
a memory in communication with the one or more processors and storing instructions that, when executed by the one or more processors, cause the system to:
search a plurality of websites to identify a first cultural term;
store the first cultural term in a database;
hash the first cultural term with a first hash function to create a first hashed cultural term;
communicate with an external authentication system via an application programming interface;
receive, from the external authentication system via the application programming interface, a password;
hash the password with the first hash function to create a hashed password;
compare the hashed password to the first hashed cultural term; and
approve or deny the password based on a similarity score.

12. The system of claim 11, wherein, when the password has been denied by the system, the instructions further cause the system to:
generate a suggested password comprising a human-readable string of characters; and
transmit the suggested password to a user device.

13. The system of claim 12, wherein the instructions further cause the system to:
hash the suggested password with the first hash function to create a hashed suggested password;
compare the hashed suggested password to the first hashed cultural term; and
approve the suggested password based on the similarity score.

14. The system of claim 12, wherein generating the suggested password comprises combining at least a portion of a second cultural term with at least a portion of a third cultural term from the database.

15. The system of claim 11, wherein receiving the password comprises:
receiving the password from a user device logging into an account associated with the system; or
receiving the password from a plurality of passwords stored in the database.

16. The system of claim 11, wherein:
the similarity score is determined by calculating a quantity of matching characters between the password and the first cultural term; and
the password is denied if the quantity of matching characters is greater than a predetermined quantity.

17. The system of claim 16, wherein the instructions further cause the system to:
replace at least a portion of characters in the first cultural term with a different letter, number, or symbol to create a modified cultural term; or
add one or more characters to the first cultural term to create the modified cultural term;
wherein calculating the quantity of matching characters between the password and the first cultural term comprises calculating a quantity of matching characters between the password and the modified cultural term.

18. The system of claim 7, the suggested password comprising a human-readable string of characters.

19. The system of claim 7, wherein generating the suggested password comprises:
generating a first random human-readable password;
comparing the first random human-readable password to the plurality of cultural terms on a secondary similarity score between the plurality of cultural terms and the first random human-readable password; and either:
approving the first random human-readable password based on the secondary similarity score;
or
denying the first random human-readable password based on the second similarity score; and
generating a second random human-readable password.

* * * * *